(12) United States Patent
Schierholz et al.

(10) Patent No.: US 8,444,950 B2
(45) Date of Patent: May 21, 2013

(54) POLYMER CARBON NANOTUBE COMPOSITES

(75) Inventors: Kai Schierholz, Saint-Amable (CA); Patrice Lucas, Montréal (CA); Bernard Boutevin, Montpellier (FR); François Ganachaud, Montpellier (FR)

(73) Assignees: Nanoledge Inc., Boucherville, Quebec (CA); Centre National de la Recherche Scientifique (CNRS), Paris (FR)

( * ) Notice: Subject to any disclaimer, the term of this patent is extended or adjusted under 35 U.S.C. 154(b) by 29 days.

(21) Appl. No.: 12/743,782

(22) PCT Filed: Nov. 21, 2008

(86) PCT No.: PCT/CA2008/002052
§ 371 (c)(1),
(2), (4) Date: Nov. 8, 2010

(87) PCT Pub. No.: WO2009/065225
PCT Pub. Date: May 28, 2009

(65) Prior Publication Data
US 2011/0046316 A1   Feb. 24, 2011

(30) Foreign Application Priority Data
Nov. 23, 2007 (EP) .................... 07301580

(51) Int. Cl.
*C09C 1/56* (2006.01)
(52) U.S. Cl.
USPC ............. 423/460; 423/445 B; 423/445 R; 526/89; 526/312; 526/317.1; 977/842; 977/847
(58) Field of Classification Search
USPC ............ 423/445 B, 445 R, 460; 526/89, 526/312, 317.1; 977/842, 847
See application file for complete search history.

(56) References Cited

U.S. PATENT DOCUMENTS

| | | | |
|---|---|---|---|
| 6,203,814 | B1 | 3/2001 | Fisher et al. |
| 7,122,165 | B2 | 10/2006 | Wong et al. |
| 7,229,747 | B2 | 6/2007 | Park et al. |
| 7,250,147 | B2 | 7/2007 | Tour et al. |
| 7,470,417 | B2 | 12/2008 | Ziegler et al. |
| 7,601,421 | B2 | 10/2009 | Khabashesku et al. |
| 2004/0265755 | A1 | 12/2004 | Park et al. |
| 2005/0147553 | A1 | 7/2005 | Wong et al. |
| 2006/0045838 | A1* | 3/2006 | Lucien Malenfant et al. ............ 423/447.1 |
| 2006/0142466 | A1 | 6/2006 | Tour et al. |
| 2006/0159612 | A1 | 7/2006 | Ziegler et al. |
| 2006/0166003 | A1 | 7/2006 | Khabashesku et al. |
| 2006/0239891 | A1* | 10/2006 | Niu et al. ........... 423/445 R |
| 2006/0249711 | A1* | 11/2006 | Niu et al. ............... 252/500 |
| 2008/0031802 | A1* | 2/2008 | Ma et al. ............. 423/447.1 |

FOREIGN PATENT DOCUMENTS

| | | |
|---|---|---|
| EP | 0716044 | 6/1996 |
| KR | 100689866 | 3/2007 |
| WO | WO01/07694 | 2/2001 |
| WO | WO2006/135439 | 12/2006 |

OTHER PUBLICATIONS

Xu, G.; Wang, Y.; Pang, W.; Wu, W.T.; Zhu, Q.; Wang, P.; Polymer International, 2007, p. 847-852 (published online Apr. 11, 2007).*
European Search Report from corresponding Euproean Patent Application No. EP07301580, mailed Jun. 18, 2008.
International Preliminary Report on Patentability and Written Opinion from corresponding International Application No. PCT/CA2008/002052, mailed Jun. 3, 2010.
Shafer, M.S.P. et al., "Polystyrene grafted multi-walled carbon nanotubes," *Chem. Commun.*, pp. 2074-2075 (Aug. 20, 2002).

* cited by examiner

*Primary Examiner* — Robert Jones, Jr.
(74) *Attorney, Agent, or Firm* — Klarquist Sparkman, LLP

(57) ABSTRACT

A method for forming polymer carbon nanotube composites, the method comprising: contacting carbon nanotubes with ozone to functionalize the sidewalls of the carbon nanotubes with at least one oxygen moiety; and reacting the functionalized carbon nanotubes with at least one monomer or at least one polymer or copolymer to attach polymer chains to the sidewalls of the carbon nanotubes.

35 Claims, 5 Drawing Sheets

POLYMER CARBON NANOTUBE COMPOSITES

CROSS REFERENCE TO RELATED APPLICATIONS

This is the U.S. National Stage of International Application No. PCT/CA2008/002052 filed Nov. 21, 2008, which was published in English under PCT Article 21(2), which in turn claims the benefit of European Patent Application No. EP07301580 filed on Nov. 23, 2007. The European application is incorporated herein in its entirety.

FIELD OF THE INVENTION

The invention relates generally to polymer carbon nanotube composites.

BACKGROUND OF THE INVENTION

Carbon nanotubes are generally elongated hollow, tubular bodies with a linear graphene structure. They are typically only a few atoms in circumference and may be single-walled or multi-walled. Carbon nanotubes are recognized as possessing excellent mechanical, chemical, electrical and thermal properties and have potential uses in a diverse number of applications from sports equipment to electroconductive paint.

One use of carbon nanotubes has been to add them to polymer matrices as separate fillers or as reinforcing agents. However, the more recent development of attaching polymers to carbon nanotubes to form polymer-carbon nanotube composites offers exciting new potential uses. By chemically or physically linking the nanotubes to the polymer chains, the resultant composites benefit from the mechanical, thermal and electrical properties of the carbon nanotubes to provide multifunctional new lightweight materials. Potential uses of such materials include structural or other parts in the aeronautic, aerospace or automotive industries, sports equipment etc.

Attempts to make such polymer-carbon nanotube composites include chemically modifying the ends or the side walls of carbon nanotubes with functional groups (known as functionalization or derivatization), which then react to form, or to link with, polymer chains.

U.S. Pat. No. 7,250,147 describes a process for the chemical modification of carbon nanotubes and their chemical incorporation into polymers. The process involves the functionalization of the sidewalls and the ends of multi- and single-wall carbon nanotubes with diazonium species using an electrochemical process. The functional group is then actively involved in a polymerisation process which results in a polymer composite material in which the carbon nanotubes are chemically involved. Electrochemical processes/diazonium species for functionalizing carbon nanotubes have the disadvantage of delicateness of handling and diazonium synthesis which involve the use of compounds such as tetrafluoroborate.

US 2006/0142466 describes a process for growing polymer chains via polymerisation from the sidewalls of functionalized carbon nanotubes, where the nanotube sidewalls are functionalized with an aryl halide or a specie comprising a nucleation site operable for anionic or ring opening polymerisation. The functionalization step is as described in U.S. Pat. No. 7,250,147 and involves an electrochemical process.

US 2004/0265755 describes a method of producing a polymerized carbon nanotube composite including modifying surfaces of the carbon nanotubes with an oxirane or an anhydride group and heat curing over a substrate. The carbon nanotubes are carboxylated by acid reflux methods before functionalizing with the oxirane or anhydride groups.

US 2006/0249711 describes processes for producing polymers containing functionalized carbon nanotubes where the carbon nanotubes are functionalized by sulfonation, electrophilic addition to deoxygenated carbon nanotube surfaces or metallation (as described in U.S. Pat. No. 6,203,814). However, these functionalization processes are only directed toward polycondensation or polyaddition polymerisation.

US 2006/0166003 describes processes for producing epoxy polymer-carbon nanotube composites involving the attachment of functional groups to the sidewalls or end caps of carbon nanotubes and the subsequent reaction of these functional groups with either epoxy precursors or the curing agents. The sidewall functional groups are formed by fluorination which yield sidewall functionalized fluorinated carbon nanotubes which typically takes place at temperatures of between 150-325° C. The fluorinated carbon nanotubes must then go through a second reaction step to yield a functional group which can be chemically linked to a polymer chain. This renders the method complex and time consuming and so difficult to step-up.

Therefore, it is desired to overcome or reduce at least some of the above-described problems.

SUMMARY OF THE INVENTION

The embodiments of the present invention reduce the difficulties and disadvantages of the aforesaid designs and treatments.

From one aspect, the present invention is directed to a method for forming polymer carbon nanotube composites, the method comprising: contacting carbon nanotubes with ozone to functionalize the sidewalls of the carbon nanotubes with at least one oxygen moiety; and reacting the functionalized carbon nanotubes with at least one monomer or at least one polymer or copolymer to attach polymer chains to the sidewalls of the carbon nanotubes.

The ozone can be in the form of an ozone containing gas or liquid. The carbon nanotubes may be in a dispersion and the dispersion is contacted with the ozone.

Advantageously, the at least one oxygen moiety which is obtained is selected from the group consisting of primary ozonides, secondary ozonides, peroxides, hydroperoxides, alcohol groups and carboxylic acid groups.

The carbon nanotubes can be dispersed in an aprotic solvent (liquid medium), the carbon nanotube dispersion being contacted with the ozone containing gas at about −78° C. to about 150° C., preferably at about −45° C. to about 150° C., and more preferably at about −45° C. to about 30° C. Advantageously, the inventors have made the surprising discovery that carbon nanotube side wall functionalization can be obtained by ozonolysis at or about room temperature by dispersing the carbon nanotubes in an aprotic liquid before ozonolysis.

Alternatively, the carbon nanotubes can be dispersed in a protic solvent (liquid medium), the carbon nanotube dispersion being contacted with the ozone containing gas at about −78° C. to about 100° C., and preferably at or about −45° C.

The carbon nanotubes can also be dispersed in a mixture of a protic solvent (liquid medium) and an aprotic solvent (liquid medium). Preferably, the temperature range is from about −78° C. to about 100° C.

In another alternative embodiment, the carbon nanotubes can be contacted with the ozone containing gas in the gas phase at a temperature range of about −78° C. to about 200° C., and preferably at about room temperature.

Advantageously, the functionalized carbon nanotubes thus obtained can then undergo "grafting from", "grafting onto" or "grafting through" polymerisation reactions to attach (graft) polymer chains to the carbon nanotubes. Advantageously, the polymer chain attachment is at least at the carbon nanotube sidewalls. In effect, the oxygen containing functional groups of the functionalized carbon nanotubes can function as macroinitiators to induce polymerisation ("grafting from" polymerisation), or can either be reacted with suitable molecules, thus forming macromers that can react with at least one suitable type of monomer ("grafting through" polymerisation), or provide bonding sites for suitable polymer chains ("grafting onto" polymerisation). Thus the oxygen containing functional group or groups of the carbon nanotubes allow chemical or physical attachment of at least one polymer chain to the carbon nanotubes.

In one embodiment, the at least one oxygen moiety of the carbon nanotubes are reacted with a suitable molecule to form a carbon nanotube macromer (carbon nanotube-molecule complex) before being reacted with the at least one monomer to attach polymer chains to the sidewalls of the carbon nanotubes ("grafting through" polymerisation). The reaction between the carbon nanotube-molecule complex and the at least one monomer may be activated or initiated through the application of energy in the form of heat, UV etc, or by the presence of a suitable chemical initiator e.g. by means of a redox reaction.

In another embodiment, the at least one oxygen moiety of the functionalized carbon nanotubes are reacted with the at least one monomer. This reaction may be activated by applying an activating energy, e.g. heat, UV, or an activating chemical initiator, e.g. by means of a redox reaction. In this case, the carbon nanotube functions as a macroinitiator.

In yet another embodiment, the at least one oxygen moiety is reacted with a functional polymer or copolymer to graft a polymer chain to the functionalized carbon nanotube. Preferably, the functional polymer or copolymer is an isocyanate containing polymer or copolymer. Preferably, the isocyanate containing copolymer is prepared by mixing 3-isopropenyl-α,α-dimethyl benzylisocyanate, styrene and an initiator, and the functionalized carbon nanotubes are contacted with the isocyanate containing copolymer for about 48 hours at about room temperature to attach polymer chains to the carbon nanotubes.

From another aspect, the present invention is directed to a method for forming polymer carbon nanotube composites, the method comprising contacting carbon nanotubes with ozone to functionalize the sidewalls of the carbon nanotubes with at least one oxygen moiety; and attaching polymer chains to the functionalized carbon nanotubes by performing radical polymerisation.

Preferably, the radical polymerisation is performed by contacting the functionalized carbon nanotubes with at least one monomer, at least one polymer or at least one copolymer to attach a polymer chain to the carbon nanotubes.

From yet another aspect, the present invention is directed to a method for forming polymer carbon nanotube composites, the method comprising contacting carbon nanotubes with ozone to functionalize the sidewalls of the carbon nanotubes with at least one oxygen moiety; and attaching polymer chains to the functionalized carbon nanotubes by performing grafting from, grafting through or grafting onto polymerisation.

Preferably, the grafting from, grafting through or grafting onto polymerisation is performed by contacting the functionalized carbon nanotubes with at least one monomer, at least one polymer or at least one copolymer to attach a polymer chain to the carbon nanotubes.

From a further aspect, the invention resides in a method for forming polymer carbon nanotube composites, the method comprising contacting carbon nanotubes with ozone to functionalize the sidewalls of the carbon nanotubes with at least one oxygen moiety; reacting the functionalized carbon nanotubes with a suitable molecule to form a carbon nanotube macromer; and contacting the carbon nanotube macromer with at least one monomer to attach polymer chains to the carbon nanotubes. Carbon nanotube macromers or the polymer carbon nanotube composites can be formed by reactions which can be activated by the application of energy, such as heat, and/or an activating chemical such as an initiator. Preferably, both an initiator and heat are applied.

From a yet further aspect, the invention resides in functionalizing at least the sidewalls of carbon nanotubes with an oxygen moiety by dispersing the carbon nanotubes in a protic or an aprotic solvent and contacting the carbon nanotube dispersion with ozone. The ozone may be in the form of an ozone containing gas or liquid. Preferably, the dispersion is contacted with the ozone at a temperature of about −78° C. to about 150° C., preferably at about −45° C. to about 150° C., and more preferably at about −45° C. to about 30° C. Advantageously, the inventors have made the surprising discovery that dispersing the carbon nanotubes in an aprotic liquid followed by performing ozonolysis on the dispersed carbon nanotubes at or about room temperature can functionalize the side walls of the carbon nanotubes with oxygen containing moieties.

It will be appreciated that the invention also resides in the intermediate and final species and products obtained by the methods described herein.

The present invention extends to carbon nanotubes having sidewalls and having polymer chains attached physically and chemically to the carbon nanotube sidewalls.

The method according to the present invention does not require the use of solvents and chemicals which require careful and delicate handling. Therefore, the methods of the present invention can be performed easily and without unnecessary safety precautions. Scaling-up of the methods are possible and envisioned to be facile. This is especially true because the methods do not require a large number of steps to produce the carbon nanotube polymer composites. A further reaction step of the functionalized carbon nanotubes is not necessary so that the functionalizing (ozonolyzing) step and the polymerisation step may be carried out as a one-pot reaction.

In the resultant polymer carbon nanotube composites, the nanotubes are an integral part of polymer chains rather than separate fillers within a polymer matrix. Polymer-nanotube composites where the nanotube is chemically associated with the polymer has the advantage that load can be transferred to the nanotubes which provides enhanced mechanical properties to the composite and also helps prevent separation between the polymer surface and the nanotubes. The thermal and electrical properties of the carbon nanotubes can also be exploited in this way.

The polymer-nanotube composites of embodiments of the present invention will find use in the fields of aeronautics and automotives, as well as sports equipment and coatings.

The invention is defined further in the following clauses:
1. A method for forming polymer carbon nanotube composites, the method comprising:

contacting carbon nanotubes with ozone to functionalize the sidewalls of the carbon nanotubes with at least one oxygen moiety; and reacting the functionalized carbon nanotubes with at least one monomer and applying an activating agent to the functionalized carbon nanotube and the at least one monomer to attach polymer chains to the sidewalls of the carbon nanotubes.

2. A method according to clause 1, wherein the activating agent is an activating energy.

3. A method according to clause 2, wherein the activating energy is thermal energy.

4. A method according to clause 1, wherein the activating chemical is a redox catalyst.

5. A method according to any one of clauses 1 to 4, wherein the at least one monomer is selected from the group consisting of acrylic, methacrylic, styrenic, vinylic or allylic monomers and mixtures thereof.

6. A method according to any one of clauses 1 to 5, further comprising dispersing the functionalized carbon nanotubes in the monomer using a solvent.

7. A method according to clause 6, wherein the solvent is toluene.

8. A method according to clause 1, wherein the monomer is methyl methacrylate and the activating agent is heat, the method further comprising dispersing the functionalized carbon nanotubes in toluene before reacting with the methyl methacrylate and heating under an inert atmosphere at about 100° C. to 140° C. for about 22 hours.

9. A method according to clause 1, wherein the monomer is acrylic acid and the activating agent is iron (II) sulphate, the method further comprising dispersing the functionalized carbon nanotubes in water before reacting with the acrylic acid and the iron (II) sulphate.

10. A method according to any one of clauses 1 to 9, wherein the carbon nanotubes are contacted with the ozone in a gas phase at a temperature range of about −78° C. to about 200° C.

11. A method according to clause 10, wherein the temperature is about room temperature.

12. A method according to clause 10 or clause 11, wherein ozone containing gas is passed through the carbon nanotubes to functionalize the sidewalls of the carbon nanotubes with at least one oxygen moiety.

13. A method according to any one of clauses 1 to 9, further comprising dispersing the carbon nanotubes in an aprotic solvent in the liquid phase, the carbon nanotube dispersion being contacted with the ozone at about −78° C. to about 150° C.

14. A method according to clause 13, wherein the carbon nanotube dispersion is contacted with the ozone at about −45° C. to about 150° C.

15. A method according to clause 14, wherein the carbon nanotubes dispersion is contacted with the ozone at about −45° C. to about 30° C.

16. A method according to any one of clauses 13 to 15, wherein the carbon nanotube dispersion is contacted with the ozone by flowing an ozone-containing gas through the carbon nanotubes.

17. A method according to any one of clauses 13 to 16, wherein the aprotic solvent is selected from the group consisting of alkanes, alkenes, aromatics, halogenated solvents, carbonylated solvents, ethered solvents, cyanated solvents, anhydride solvents, and mixtures thereof.

18. A method according to clause 17, wherein the aprotic solvent is chloroform.

19. A method according to any one of clauses 1 to 9, wherein the carbon nanotubes are dispersed in a protic solvent, the carbon nanotube dispersion being contacted with the ozone at about −78° C. to about 100° C.

20. A method according to clause 19, wherein the carbon nanotube dispersion is contacted with the ozone at about −45° C.

21. A method according to clauses 19 or clause 20, wherein the carbon nanotube dispersion is contacted with the ozone by flowing an ozone-containing gas through the carbon nanotubes.

22. A method according to any one of clauses 19 to 21, wherein the protic solvent is selected from the group consisting of alcohols, acidic solvents, water, and mixtures thereof.

23. A method according to clause 22, wherein the protic solvent is ethanol.

24. A method according to any one of clauses 1 to 9, wherein the carbon nanotubes are dispersed in a mixture of a protic and a non-protic solvent, the carbon nanotube dispersion being contacted with the ozone at about −78° C. to about 100° C.

25. A method according to any one of clauses 1 to 24, wherein the at least one oxygen moiety is selected from the group consisting of primary ozonides, secondary ozonides, peroxides, hydroperoxides, alcohol groups and carboxylic acid groups.

26. A method for forming polymer carbon nanotube composites, the method comprising:

contacting carbon nanotubes with ozone to functionalize the sidewalls of the carbon nanotubes with at least one oxygen moiety; and reacting the functionalized carbon nanotubes with at least one monomer or at least one polymer or copolymer to attach polymer chains to the sidewalls of the carbon nanotubes, wherein the carbon nanotubes are dispersed in an aprotic solvent and contacted with the ozone at about −78° C. to about 150° C.

27. A method according to clause 26, wherein the carbon nanotubes are contacted with the ozone at about −45° C. to about 150° C.

28. A method according to clause 27, wherein the carbon nanotubes are contacted with the ozone at about −45° C. to about 30° C.

29. A method according to any one of clauses 26 to 28, wherein the carbon nanotube dispersion is contacted with the ozone by flowing an ozone-containing gas through the carbon nanotubes.

30. A method according to any one of clauses 26 to 29, wherein the aprotic solvent is selected from the group consisting of alkanes, alkenes, aromatics, halogenated solvents, carbonylated solvents, ethered solvents, cyanated solvents, anhydride solvents, and mixtures thereof.

31. A method according to clause 30, wherein the aprotic solvent is chloroform.

32. A method according to any one of clauses 26 to 31, wherein the at least one oxygen moiety of the carbon nanotubes are reacted to form macromer carbon nanotubes before being reacted with the at least one monomer to attach polymer chains to the sidewalls of the carbon nanotubes.

33. A method according to clause 32, further comprising applying an activating agent to the macromer carbon nanotubes and the at least one monomer to attach polymer chains to the sidewalls of the carbon nanotubes.

34. A method according to clause 33, wherein the activating agent is an activating energy.

35. A method according to clause 34, wherein the activating energy is thermal energy.

36. A method according to clause 33, wherein the activating chemical is a redox catalyst.

37. A method according to clause 32, wherein the functionalized carbon nanotubes are contacted with isocyanatoethylmethacrylate to generate methacrylate carbon nanotube macromers which are then contacted with an initiator in a solvent and then reacted with methyl methacrylate and heated.

38. A method according to clause 32, wherein the functionalized carbon nanotubes are contacted with 3-isopropenyl-α,α-dimethyl benzylisocyanate to generate styrene carbon nanotube macromers which are then dispersed in an initiator and then reacted with styrene and heated.

39. A method according to any one of clauses 26 to 31, wherein the at least one polymer or copolymer is an isocyanate containing polymer or copolymer.

40. A method according to clause 39, wherein the isocyanate containing polymer or copolymer is selected from the group consisting of poly(styrene-co-3-isopropenyl-α,α-dimethyl benzylisocyanate), poly(isocyanato-ethylmethacrylate) and poly(3-isopropenyl-α,α-dimethyl benzylisocyanate).

41. A method according to clause 40, further comprising dispersing the functionalized carbon nanotubes in a medium before contacting the copolymer.

42. A method according to any one of clauses 39 to 41, wherein the isocyanate containing copolymer is prepared by mixing 3-isopropenyl-α,α-dimethyl benzylisocyanate, styrene and an initiator.

43. A method according to clause 42, wherein the functionalized carbon nanotubes are contacted with the isocyanate containing copolymer for about 48 hours at about room temperature to attach polymer chains to the carbon nanotubes.

44. A method for forming polymer carbon nanotube composites, the method comprising:
    contacting carbon nanotubes with ozone to functionalize the sidewalls of the carbon nanotubes with at least one oxygen moiety;
    reacting the at least one oxygen moiety of the carbon nanotubes to form macromer carbon nanotubes; and
    reacting the macromer carbon nanotubes with at least one monomer to attach polymer chains to the sidewalls of the carbon nanotubes.

45. A method according to clause 44, further comprising applying an activating agent to the macromer carbon nanotubes and the at least one monomer to attach polymer chains to the sidewalls of the carbon nanotubes.

46. A method according to clause 45, wherein the activating agent is an activating energy.

47. A method according to clause 46, wherein the activating energy is thermal energy.

48. A method according to clause 45, wherein the activating chemical is a redox catalyst.

49. A method according to clause 44, wherein the functionalized carbon nanotubes are contacted with isocyanatoethylmethacrylate to generate methacrylate carbon nanotube macromers which are then contacted with an initiator in a solvent and then reacted with methyl methacrylate and heated.

50. A method according to clause 44, wherein the functionalized carbon nanotubes are contacted with 3-isopropenyl-α,α-dimethyl benzylisocyanate to generate styrene carbon nanotube macromers which are then dispersed in an initiator and then reacted with styrene and heated.

51. A method according to any one of clauses 44 to 50, wherein the carbon nanotubes are contacted with the ozone in a gas phase at a temperature range of about −78° C. to about 200° C.

52. A method according to clause 51, wherein the temperature is about room temperature.

53. A method according to clause 51 or clause 52, wherein ozone containing gas is passed through the carbon nanotubes to functionalize the sidewalls of the carbon nanotubes with the at least one oxygen moiety.

54. A method according to any one of clauses 44 to 50, wherein the carbon nanotubes are dispersed in a protic solvent, the carbon nanotube dispersion being contacted with the ozone at about −78° C. to about 100° C.

55. A method according to clause 54, wherein the carbon nanotube dispersion is contacted with the ozone at about −45° C.

56. A method according to clauses 54 or clause 55, wherein the carbon nanotube dispersion is contacted with the ozone by flowing an ozone-containing gas through the carbon nanotubes.

57. A method according to any one of clauses 54 to 56, wherein the protic solvent is selected from the group consisting of alcohols, acidic solvents, water, and mixtures thereof.

58. A method according to clause 57, wherein the protic solvent is ethanol.

59. A method for forming polymer carbon nanotube composites, the method comprising:
    contacting carbon nanotubes with ozone to functionalize the sidewalls of the carbon nanotubes with at least one oxygen moiety; and
    reacting the functionalized carbon nanotubes with at least one polymer or copolymer to attach polymer chains to the sidewalls of the carbon nanotubes, wherein the at least one polymer or copolymer is an isocyanate containing polymer or copolymer.

60. A method according to clause 59, wherein the isocyanate containing polymer or copolymer is selected from the group consisting of poly(styrene-co-3-isopropenyl-α,α-dimethyl benzylisocyanate), poly(isocyanato-ethylmethacrylate) and poly(3-isopropenyl-α,α-dimethyl benzylisocyanate).

61. A method according to clause 59 or clause 60, further comprising dispersing the functionalized carbon nanotubes in a medium before contacting the copolymer.

62. A method according to any one of clauses 59 to 61, wherein the isocyanate containing copolymer is prepared by mixing 3-isopropenyl-α,α-dimethyl benzylisocyanate, styrene and an initiator.

63. A method according to clause 62, wherein the functionalized carbon nanotubes are contacted with the isocyanate containing copolymer for about 48 hours at about room temperature to attach polymer chains to the carbon nanotubes.

64. A method according to any one of clauses 59 to 63, wherein the carbon nanotubes are contacted with the ozone in a gas phase at a temperature range of about −78° C. to about 200° C.

65. A method according to clause 64, wherein the temperature is about room temperature.

66. A method according to clause 64 or clause 65, wherein ozone containing gas is passed through the carbon nanotubes to functionalize the sidewalls of the carbon nanotubes with the at least one oxygen moiety.

67. A method according to any one of clauses 59 to 63, wherein the carbon nanotubes are dispersed in a protic solvent, the carbon nanotube dispersion being contacted with the ozone at about −78° C. to about 100° C.

68. A method according to clause 67, wherein the carbon nanotube dispersion is contacted with the ozone at about −45° C.

69. A method according to clauses 67 or clause 68, wherein the carbon nanotube dispersion is contacted with the ozone by flowing an ozone-containing gas through the carbon nanotubes.

70. A method according to any one of clauses 67 to 69, wherein the protic solvent is selected from the group consisting of alcohols, acidic solvents, water, and mixtures thereof.
71. A method according to clause 70, wherein the protic solvent is ethanol.

BRIEF DESCRIPTION OF THE DRAWINGS

Further aspects and advantages of the present invention will become better understood with reference to the description in association with the following in which.

DETAILED DESCRIPTION OF THE INVENTION

Figure 1:
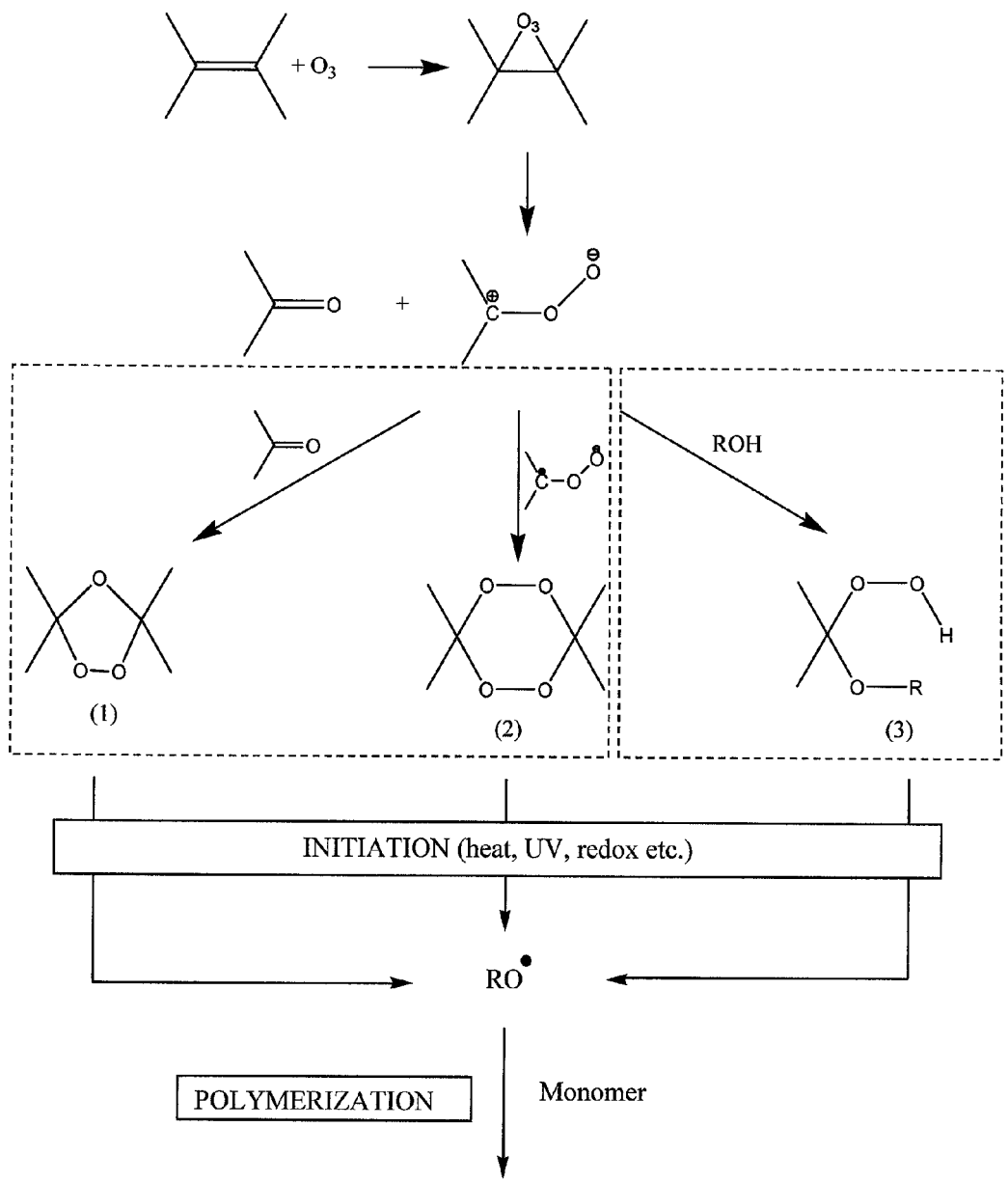
FIG. 1 is a schematic illustration of ozonolysis of carbon nanotubes in a gas phase, a non-participating solvent or a participating solvent, followed by a "grafting from" polymerisation step according to some embodiments of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

As used herein, the terms "nanotubes" and "carbon nanotubes" are as understood by persons skilled in the art and denote carbon-based structures which are substantially cylindrical and can be closed at both ends or at one end only or open at both ends. The closed end of a carbon nanotube is known as an end cap or tip. The carbon-based structures can include tubes, fibrils, fibres, whiskers, bucky tubes etc. which may be straight or bent. Nanotubes may be single-wall (SWNT), double-wall (DWNT) or multi-wall (MWNT), or mixtures thereof.

The terms "bare nanotubes" or "pristine nanotubes", as used herein, denote nanotubes which have not undergone any surface modification treatment subsequent to synthesis and/or purification, be it chemical or otherwise.

The terms "functionalized nanotube" or "derivatized nanotube" refers to a carbon nanotube whose surface(s), which may be at the sides and/or ends of the nanotube, are uniformly or non-uniformly modified so as to have a functional chemical moiety or moieties associated with the carbon nanotube. The terms "sidewall functionalization" or "sidewall derivatization" are defined herein to include bonds made to the nanotube wall (as opposed to only the nanotube ends) where most of the carbon-carbon bonds of the wall are kept intact. Sidewall functionalization may also include some functionalization of the end caps.

The term "polymer-carbon nanotube composite", as used herein, refers to carbon nanotubes having polymer chains attached to the surface(s) of the carbon nanotubes. The polymer chains may be chemically attached (e.g. by covalent bonding) or physically attached (e.g. by adsorption).

The present invention concerns methods of functionalizing the surface(s) of carbon nanotubes to produce polymer-carbon nanotube composites. The functionalized surfaces may be at the sidewalls or the end caps of the carbon nanotubes. The polymer-carbon nanotube composites of the present invention comprise polymer chains attached or chemically bonded to the carbon nanotube surfaces, preferably at the carbon nanotube sidewalls but also at end caps.

From a broad aspect, one embodiment of the method of the present invention involves a first step of functionalizing the surfaces of carbon nanotubes by treating the carbon nanotubes with ozone (ozonolysis step) and a second step of attaching polymer chains to the functionalized carbon nanotube surfaces (polymerisation step). Advantageously, the polymer chains are attached to at least the sidewalls of the carbon nanotubes. The first and second steps can be a one-pot reaction. By one-pot reaction it is meant that the functionalized carbon nanotubes are used as-synthesized to form polymer composites without an intervening treatment step such as a purification or a separation step. The various embodiments of the present invention include various ozonolysis and polymerisation steps and their different combinations. Some of these embodiments are described below and illustrated in FIGS. 1 to 3.

The carbon nanotubes that are to be functionalized according to an embodiment of the present invention may be bare or pristine carbon nanotubes, or they can be carbon nanotubes which are already end or sidewall functionalized. The carbon nanotubes may be single-walled, multi-walled, double-walled or mixtures thereof, and may have partially or fully open or closed ends. The bare or pristine nanotubes can be made by any known method. For example, carbon nanotubes can be synthesized by physical (high temperature) methods like electric arc discharge or laser ablation, or chemical methods such as CVD, CCVD, PECVD. Carbon nanotubes thus produced typically have a diameter of about 0.2 to 100 nm or more than 100 nm, more typically about 0.5 to 50 nm, and a length of about less than one micron to several centimeters.

In a first embodiment of ozonolysis, carbon nanotubes are ozonolyzed (functionalized) in the liquid phase at about −78° C. to about 150° C., preferably at about −45° C. to about 150° C., more preferably at about −45° C. to about 30° C., and most preferably at or about room temperature. Ozonolysis is performed by flowing ozone gas, an ozone containing gas or an ozone containing liquid through carbon nanotubes dispersed in a non-participating solvent.

By non-participating solvent it is meant an aprotic solvent as it will be understood to a person skilled in the art, i.e. a solvent which does not donate protons. Examples of non-participating solvents include alkanes such as pentane, hexane, petroleum ether, cyclohexane, decane, and isobutane etc.; alkenes and aromatics such as benzene and toluene, etc.; halogenated solvents such as carbon tetrachloride, chloroform, dichloromethane, methylene chloride, methyl chloride, ethyl chloride, propyl chloride, ethyl bromide, monofluorotrichloromethane, 1,1,2-trifluoro-1,2,2-trichloroethane, 1-chlorobutane, chloroethane, chlorobenzene, chloroethane, and 1-chlorobutane, etc.; carbonylated solvents such as ethyl acetate, acetone, formamide, methyl acetate, methyl formate, etc.; ethered solvents such as ether, tetrahydrofuran, dibutyl ether, 1,4-dioxane, dipropyl ether etc.; cyanated solvents such as nitromethane and nitrobenzene etc.; and anhydrid solvents such as acetic anhydride etc. The non-participating solvent can also be mixtures of any non-participating solvents. It will be appreciated that any other equivalent or suitable solvent, not listed above, may also be used with the present invention.

The preferred alkane non-participating solvents are pentane, hexane, petroleum ether, and cyclohexane. The preferred alkenes and aromatic participating solvent is benzene. The preferred halogenated non-participating solvents are carbon tetrachloride, chloroform, dichloromethane, methylene chloride, methyl chloride, ethyl chloride, propyl chloride, ethyl bromide, monofluorotrichloromethane, 1,1,2-trifluoro-1,2,2-trichloroethane. The preferred carbonylated non-participating solvents are ethyl acetate, acetone and formamide. The preferred ethered non-participating solvents are ether and tetrahydrofuran. The preferred cyanated non-participating solvent is nitromethane. The preferred anhydride non-participating solvent is acetic anhydride.

The ozone gas is preferably an ozone/oxygen gas mix, although the ozone may also be mixed or diluted with any other gas such as air, or comprise ozone only (pure ozone). Preferably, the ozone containing gas is an ozone/oxygen mixture with the ozone constituent ranging from about 2% to about 100% of the total mixture. Any type of known or conventional ozone generator may be used to produce the ozone or the ozone containing gas. The ozone flow rate and the ozone contact time are dependent on the quantity of the carbon nanotubes being contacted. For about 6 g of pristine carbon nanotubes dispersed in about 600 ml of non-participating solvent, the rate of ozone flow through the carbon nanotube dispersion may range between about 2 to about 30 $gO_3/h$. The carbon nanotubes may be contacted with ozone for between about 1 to about 12 hours followed by an oxygen purge for between about 0.5 to about 2 hours.

In one embodiment, about 6 g of pristine carbon nanotubes are dispersed in about 600 ml of non-participating solvent, and ozonolysis is performed using an ozone generator, such as a Trailigaz Ozobloc™, for about 8 hours with an ozone flow rate of about 10 g/h followed by an air purge for about 1 hour.

It is thought that ozonolysis in a non-participating solvent yields carbon nanotubes having surfaces functionalized with primary ozonide groups (also known as molozonides and 1,2,3-trioxolane), secondary ozonide groups (e.g. 1,2,4-trioxolane), peroxide groups (e.g. dimeric peroxide), alcohol groups and carboxylic acid groups. Without being held to any theory, primary ozonides are thought to evolve very quickly to zwitterions then secondary ozonides at the temperature of ozonolysis of this embodiment. Therefore, it is thought that the subsequent polymerisation step will involve the secondary ozonide, peroxide, alcohol and carboxylic acid groups.

A second embodiment of ozonolysis differs from the ozonolysis of the first embodiment in that carbon nanotubes are ozonolyzed by flowing ozone gas through carbon nanotubes dispersed in a participating solvent in the liquid phase at about −78° C. to about 100° C., and preferably at or about −45° C.

By participating solvent it is meant a protic solvent i.e. a solvent which donates proton(s). Examples of participating solvents include alcohols such as methanol, ethanol, 1-propanol, isopropyl alcohol, 1-butanol, tert-butyl alcohol, pentanol, 1-hexanol, heptanol, cyclohexanol, phenol, 2-butanol, etc.; acidic solvents such as formic acid, acetic acid, propionic acid etc.; and water. The participating solvent can also be mixtures of any participating solvents. It will be appreciated that any other participating solvent equivalent or suitable solvent, not listed above, may also be used with the present invention.

The preferred alcohol participating solvents are methanol, ethanol, 1-propanol, isopropyl alcohol, 1-butanol, tert-butyl alcohol, pentanol, 1-hexanol. The preferred acidic solvents are formic acid, acetic acid and propionic acid.

It is thought that ozonolysis in a participating solvent yields carbon nanotubes having surfaces functionalized with zwitterions which can evolve to hydroperoxide.

A third embodiment of ozonolysis differs from the ozonolysis method of the first embodiment in that carbon nanotubes are dispersed in a mixture of non-participating and participating solvents at a temperature range and for a time period adequate for sidewall functionalization to occur. Preferably, the temperature range is from about −78° C. to about 100° C. for about 1-12 hours.

In a fourth embodiment of ozonolysis, ozonolysis is performed in a gas phase at a temperature range of about −78° C. to about 200° C., and preferably at about room temperature. This embodiment differs from the first ozonolysis embodiment in that the carbon nanotubes are not dispersed in a liquid medium and ozonolysis is preferably performed in a fluidized bed reactor using an ozone containing gas flow such as ozone, an ozone/oxygen mixture or an ozone/air mixture which is passed through carbon nanotubes. In a preferred embodiment, about 6 g of pristine carbon nanotubes are ozonolyzed using an ozone generator, such as Trailigaz Ozobloc™, for about 4 hours with an ozone flow rate of about 6 g/h followed by an air purge for about 1 hour.

It is thought that ozonolysis in the gas phase yields carbon nanotubes having surfaces functionalized with primary ozonide groups (also called molozonides), secondary ozonide groups (e.g. 1,2,4-trioxolane), peroxide groups (e.g. dimeric peroxide), alcohol groups and carboxylic acid groups. Without being held to any theory, primary ozonides are thought to evolve very quickly to zwitterions then to secondary ozonides at the temperature of ozonolysis of this embodiment. Therefore, it is thought that the subsequent polymerisation step will involve the secondary ozonide, peroxide, alcohol and carboxylic acid groups.

The ozonolysis step provides carbon nanotubes with functionalized surfaces including functional groups at the carbon nanotube sidewalls. Typically, the sidewall functional groups are oxygen moieties such as hydroperoxide, peroxide, alcohol or carboxylic acid. These ozonolyzed carbon nanotubes can be considered as macroinitiators for polymer chain attachment (grafting). Without wishing to be bound by theory, the mechanisms of ozonolysis in non-participating solvents, participating solvents and in the gas phase are illustrated in FIG. 1.

Alternatively, carbon nanotubes can be functionalized with carboxylic acid, acyl chloride, alcohol and derivative functions such as amine through treatments other than ozonolysis such as acidic treatment, $KMnO_4$ treatment, $OsO_4$ treatment or any other treatment yielding functionalized carbon nanotubes.

The functionalized carbon nanotubes can be isolated and stored by washing and drying. Alternatively, the functionalized carbon nanotubes can be used as-synthesized to form polymer composites without any further purification or separation step.

Figure 2:
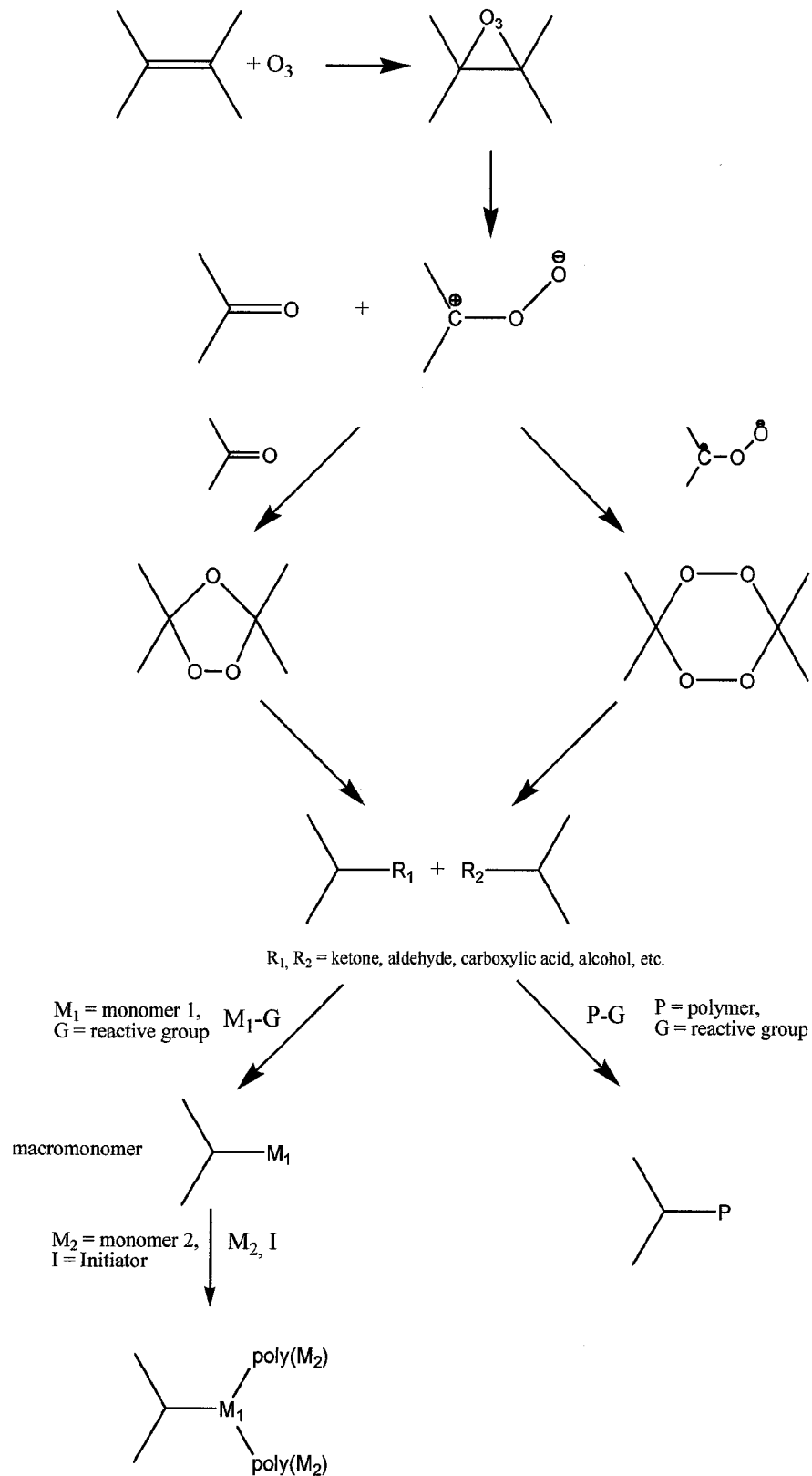
FIG. 2 is a schematic illustration of ozonolysis of carbon nanotubes in a non-participating solvent followed by a "grafting through" or a "grafting onto" polymerisation step according to further embodiments of the present invention.
Figure 3:
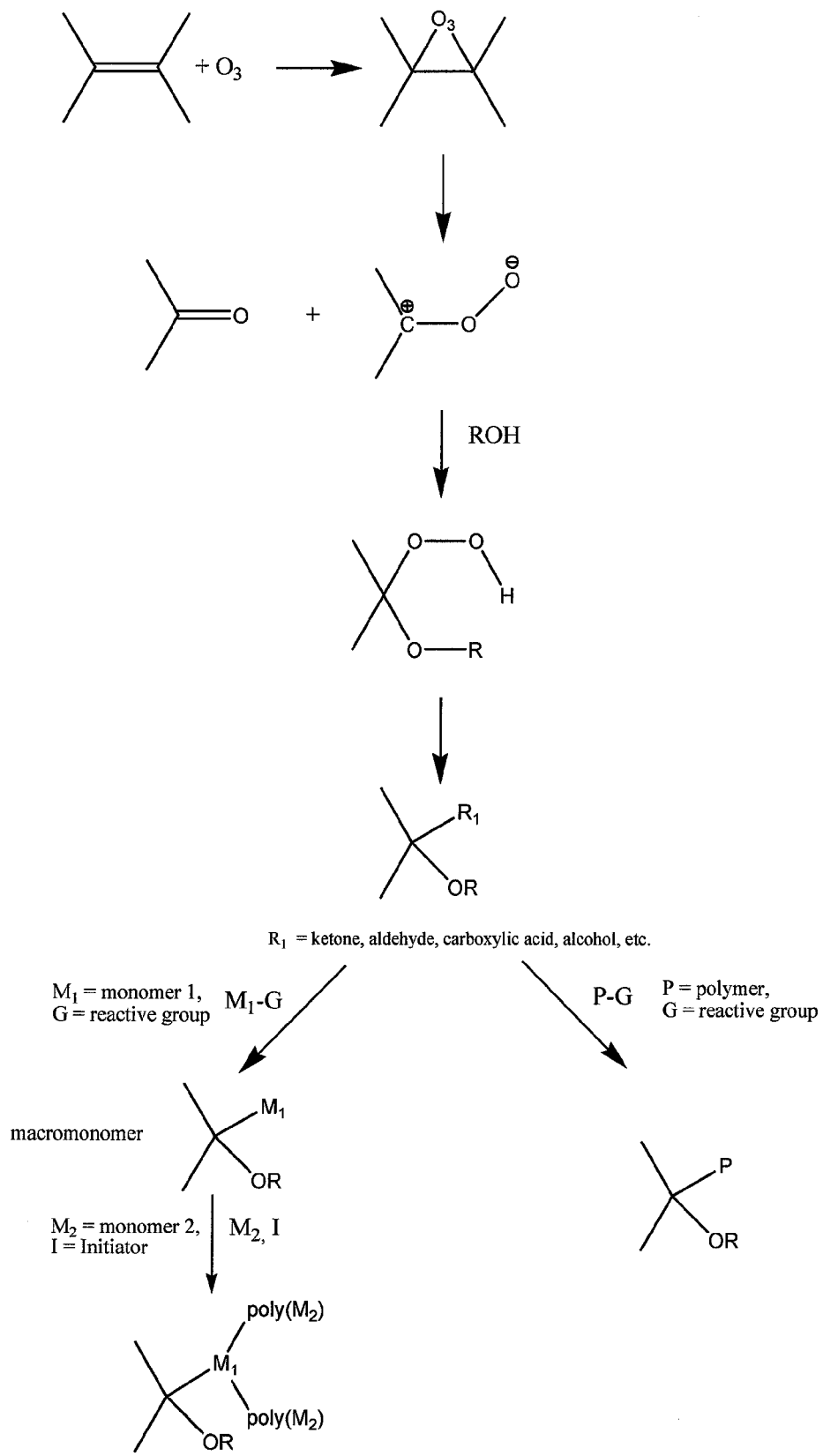
FIG. 3 is a schematic illustration of ozonolysis of carbon nanotubes in the gas phase or in a participating solvent followed by a "grafting through" or a "grafting onto" polymerisation step according to yet further embodiments of the present invention.
Figure 4:
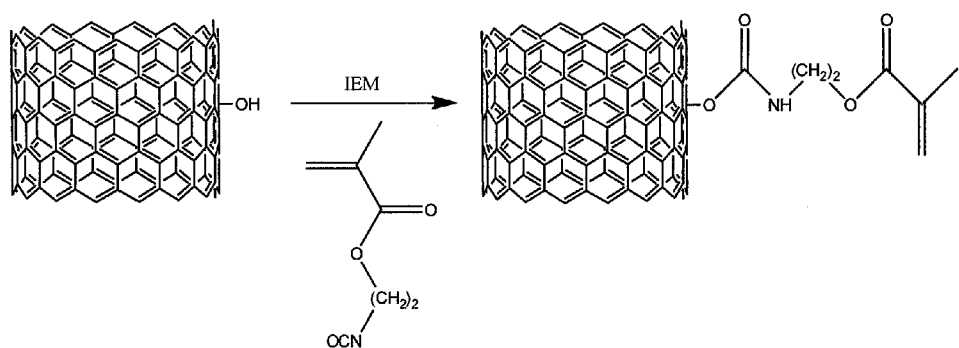
FIG. 4 illustrates the generation of a macromonomer carbon nanotube, according to one embodiment of the present invention, involving a synthesis through reaction of a functionalized carbon nanotube with isocyanato-ethylmethacrylate.

The polymerisation step of the embodiments of the present inventions can include any polymerisation reaction involving the functional groups attached to the carbon nanotubes produced through the ozonolysis step described above. In other words, any polymerisation reactions involving the hydroperoxide, peroxide, alcohol or carboxylic acid oxygen moieties are included within the scope of the present application. Three such suitable polymerisation reactions include "grafting from", "grafting through" and "grafting onto" polymerisation. Some of these methods include radical polymerisation. Any of the polymerisation steps described below can be performed on any of the functionalized carbon nanotubes obtained using the methods of the present invention described above, or any other ozonolysis methods. The mechanisms of the various polymerisation steps are illustrated in FIGS. 1, 2 and 3.

In "grafting from" polymerisation, polymerisation is activated or initiated in a suitable manner in the presence of a suitable monomer (FIG. 1). An initiator is not needed. For example, polymerisation can be initiated by thermal or oxido-reduction decomposition of the macroinitiator (functionalized) carbon nanotubes in the presence of a suitable monomer. Alternatively, other initiation methods are also possible such as by electron beam, other radiation initiation, UV, ultrasonication, microwaves and any other techniques of peroxide and hydroperoxide decomposition.

Examples of suitable monomers include methyl methacrylate, styrene, acrylic acid or any acrylic, methacrylic, styrenic, vinylic or allylic monomer and mixtures thereof. The functionalized carbon nanotubes are dispersed in the monomer, or can be dispersed in any suitable medium or solvent additional to the monomer, which can be in the liquid or gas phases. Toluene is one such suitable solvent. In thermally initiated "grafting from" polymerisation, the functionalized carbon nanotube and monomer mixture is heated to a suitable temperature for a time period sufficient for polymerisation to be initiated and for polymerisation to take effect. In one embodiment, functionalized carbon nanotubes are dispersed in toluene, then methyl methacrylate is added and the mixture is heated under an inert atmosphere at about 100° C. to about 140° C. for about 22 hours.

In redox initiated "grafting from" polymerisation, the functionalized carbon nanotubes are contacted with an appropriate redox catalyst and an appropriate monomer for a sufficient time period to effect polymerisation. The functionalized carbon nanotube and monomer mixture may be heated to a suitable temperature for a time period sufficient for polymerisation to take effect. In one embodiment, functionalized carbon nanotubes are dispersed in water, and acrylic acid and iron(II) sulphate are added and the mixture is placed under an inert atmosphere at about room temperature for about 22 hours.

Without wishing to be held to any theory, it is believed that in the case of carbon nanotubes ozonolyzed in a non-participating solvent, "grafting from" polymerisation is initiated from secondary ozonides and any other peroxidic species evolving from the zwitterions generated in the ozonolysis step.

In "grafting through" polymerisation, polymer grafted carbon nanotubes are obtained by copolymerisation of macromonomer (macromer) carbon nanotubes with one or more suitable monomers (FIGS. 2 and 3). The macromonomer carbon nanotubes are generated by performing a further reaction step on the carbon nanotubes functionalized according to the present invention. The macromonomer carbon nanotubes can be dispersed in a suitable medium additional to the monomer. The medium may be in the liquid or gas phase. Examples of suitable monomers include methyl methacrylate, glycidyl methacrylate and styrene. Polymerisation can be initiated by thermal or oxido-reduction decomposition of the macroinitiator (functionalized) carbon nanotubes in the presence of a suitable monomer. Alternatively, other initiation methods are also possible such as by electron beam, other radiation initiation, UV, ultrasonication, microwaves and any other techniques of peroxide and hydroperoxide decomposition.

In one embodiment of "grafting through" polymerisation, the functionalized carbon nanotubes are contacted with isocyanatoethylmethacrylate at about room temperature for about 24 hours to generate methacrylate carbon nanotube macromers. These are then contacted with an initiator, such as AIBN, in a solvent, such as toluene, under an inert atmosphere. A monomer, such as methyl methacrylate, is added and heated to about 70° C. for about 62 hours.

In another embodiment, the methacrylate carbon nanotube macromers are contacted with an initiator, such as AIBN, in a solvent such as toluene, under an inert atmosphere. Methyl methacrylate and glycidyl methacrylate are added and heated to about 70° C. for about 48 hours.

In yet another embodiment of "grafting through" polymerisation, the ozonolyzed carbon nanotubes are contacted with 3-isopropenyl-α,α-dimethyl benzylisocyanate (about 4 g) at about room temperature for about 66 hours to generate styrene carbon nanotube macromers. These are then dispersed in a suitable initiator, such as AIBN, and optionally in a liquid medium such as toluene, under an inert atmosphere. Styrene is added and heated to about 70° C. to effect copolymerisation.

In "grafting onto" polymerisation, polymer grafted carbon nanotubes are obtained by reaction of isocyanate containing polymers or copolymers with ozonolyzed carbon nanotubes (FIGS. 2 and 3). Examples of suitable copolymers include poly(styrene-co-3-isopropenyl-α,α-dimethyl benzylisocyanate) and suitable isocyanate polymers include poly(isocyanato-ethylmethacrylate) or poly(3-isopropenyl-α,α-dimethyl benzylisocyanate). Alternatively, the ozonolyzed carbon nanotubes can be reacted with any other functionalized polymer, e.g. anhydride, acyl chloride or amine functionalized polymers.

In one embodiment of "grafting onto" polymerisation, a copolymer is prepared by mixing 3-isopropenyl-α,α-dimethyl benzylisocyanate, styrene and AIBN, or any other suitable initiator, in toluene at about 70° C. for about 77 hours under an inert atmosphere. The ozonolyzed carbon nanotubes are then contacted with this copolymer for about 48 hours at about room temperature to generate polymer grafted carbon nanotubes. The ozonolyzed carbon nanotubes may optionally be dispersed in a medium, such as toluene, before contacting the copolymer.

The vinyl monomers suitable for use in the methods of the present invention include acrylic monomers such as acrylic acid, Allyl acrylate, Benzyl acrylate, 4-Biphenylyl acrylate, 2-Bromo-acrylate, 2-Bromo-ethyl acrylate, 2-Bromoethyl acrylate, 2-Bromomethyl-acrylate, 2-Bromomethyl-ethyl acrylate, 2-Bromomethyl-methyl acrylate, 1,3-Butylene diacrylate, 1,4-Butylene diacrylate, 2-Butylene-1,4 diacrylate, 2-(2-Butoxyethoxy)ethyl acrylate, 2-Butoxyethyl acrylate, Butyl acrylate, Chloro-acrylate, 2-Chloro-butyl acrylate, 2-Chloro-ethyl acrylate, 2-Cyano-butyl acrylate, 2-Cyano-, Ethyl acrylate, 2-Cyanoisobutyl acrylate, 2-Cyanoethyl acrylate, Cyclohexyl acrylate, Cyclopentyl acrylate, n-Decyl acrylate, 2-(Diethylamino)ethyl acrylate, 3-(Diethylamino) propyl acrylate, Di(ethylene glycol)diacrylate, Dihydrodicyclopentadienyl acrylate, 2,3-Dihydroxypropyl acrylate, 2-(Dimethylamino)ethyl acrylate, 3-(Dimethylamino)neopentyl-acrylate, 3-(Dimethylamino)propyl acrylate, Di(propylene glycol)diacrylate, Di(trimethylolpropane)tetracrylate, Dodecyl acrylate, 2-(2-Ethoxyethoxy)ethyl acrylate, 2-Ethoxyethyl acrylate, Ethyl acrylate, Ethylene diacrylate, 2-Ethylhexyl acrylate, Glycidyl acrylate, 1H,1H,2H,2H-Heptadecafluorodecylacrylate, 1H, 1-H-Heptafluorobutyl acrylate, Heptyl acrylate, Hexadecyl acrylate, 2,2,3,4,4,4-Hexafluorobutyl acrylate, 1H-Hexafluoroisoporpyl acrylate, Hexanediol diacrylate, n-Hexyl acrylate, 4-Hydroxybutyl acrylate, 2-Hydroxyethyl acrylate, 2-Hydroxy-3-phenoxypropyl acrylate, 2-Hydroxypropyl acrylate, Isobornyl acrylate, Isobutyl acrylate, Isodecyl acrylate, Isooctyl acrylate, Isopropoxyethyl acrylate, Isopropyl acrylate, Methallyl acrylate, 2-(2-Methoxyethoxy)ethyl acrylate, 2-Methoxyethyl acrylate, Naphthyl acrylate, Neopentyl acrylate, Neopentyl glycol diacrylate, Nonyl acrylate, Octadecyl acrylate, 1H,1H, 5H-Octafluoropentyl acrylate-, n-Octyl acrylate, 1H,1H-Pentadecafluorooctyl acrylate, 2,2,3,3,3-Pentafluoropropyl acrylate, 1,5-Pentanediol diacrylate, n-Pentyl acrylate, 2-Phenoxyethyl acrylate, Phenyl acrylate, 1,4-Phenylene diacrylate, 1,4-Phenylene di(acrylic acid), 2-Phenylethyl acrylate, Trimethyl 2-phosphonoacrylate, Propargyl acrylate, n-Propyl acrylate, 1,2-Propylene glycol diacrylate, 1,3-Propylene glycol diacrylate, Tetradecyl acrylate, Tetra(ethylene glycol) diacrylate, 2,2,3,3-Tetrafluoropropyl acrylate, 2,3,3-Trichloro acrylate, Tridecyl acrylate, Tri(ethylene glycol)diacrylate, 2,2,2-Trifluoroethyl acrylate, 1,1,1-Tri(2-hydroxyethoxymethyl)propane triacrylate, Tri(2-hydroxyethyl) isocyanurate triacrylate, 3,5,5-Trimethylcyclohexyl acrylate, 3,5,5-Trimethylhexyl acrylate, Tri(propylene glycol)diacrylate, Vinyl acrylate; methacrylic monomers such as Methacrylic Acid, 2-(Acetoacetoxy)ethyl methacrylate, allyl methacrylate, Benzyl methacrylate, Bisphenol A dimethacrylate, 2-Butoxyethyl methacrylate, n-Butyl methacrylate, s-Butyl methacrylate, tert-Butyl methacrylate, N-tert-Butyl-2-aminoethyl methacrylate, 2-Chloro-2-hydroxypropyl methacrylate, 2-Chloroethyl methacrylate, Chloromethyl methacrylate, 2-Cyanoethyl methacrylate, 1,4-Cyclohexanediol dimethacrylate, Cyclohexyl methacrylate, Decanediol dimethacrylate, Decyl methacrylate, 2,3-Dibromopropyl methacrylate, 2-(Dibutylamino)ethyl methacrylate, Dicyclopentenyl methacrylate, Dicyclopentenyloxyethyl methacrylate, 2-(Diethylamino)ethyl methacrylate, 3-(Dimethylamino)propyl methacrylate, 3,4-Dihydroxybutyl methacrylate, 2,3-Dihydroxypropyl methacrylate, 2-(Dimethylamino)ethyl methacrylate, 1H, 1H,7H-Dodecafluoroheptylmethacrylate, Dodecyl methacrylate, 2,3-Epoxybutyl methacrylate, 3,4-Epoxybutyl methacrylate, 2,3-Epoxyopropyl methacrylate, 4-Ethoxybutyl methacrylate, 2-Ethoxyethyl methacrylate, Ethyl methacrylate, Ethyl 2-bromomethyl-methacrylate, 2-Ethylbutyl methacrylate, 1,2-Ethylene dimethacrylate, 2-Ethylhexyl methacrylate, Ethyl 2-(trimethoxysilylmethyl-) methacrylate, Furfuryl methacrylate, Glycidyl methacrylate, 1H,1H,2H,2H-Heptadecafluorodecyl methacrylate, 1H, 1-H-Heptafluorobutyl methacrylate, Heptyl methacrylate, 2,2,3,4,4,4-Hexafluorobutyl methacrylate, 1H-Hexafluoroisopropyl methacrylate, Hexyl methacrylate, 4-Hydroxybutyl methacrylate, 2-Hydroxyethyl methacrylate, 3-oxopropyl methacrylate, 3-Hydroxypropyl methacrylate, Isobornyl methacrylate, Isobutyl methacrylate, 2-Isocyanatoethyl methacrylate, Isodecyl methacrylate, Isopropyl methacrylate, Methallyl methacrylate, 2-(2-Methoxyethoxy)ethyl methacrylate, 2-Methoxyethyl methacrylate, Methyl methacrylate, 2-Methyl-2-nitropropyl methacrylate, 2-(Methylthio)ethyl methacrylate, Methyl 2-bromomethyl methacrylate, Nonyl methacrylate, 4-Nonylphenyl methacrylate, Octadecyl methacrylate, n-Octyl methacrylate, Pentabromophenyl methacrylate, Pentachlorophenyl methacrylate, 1H, 1-H-Pentafluorooctyl methacrylate, 2,2,3,3,3-Pentafloropropyl methacrylate, Pentyl methacrylate, 2-Phenoxyethyl methacrylate, Phenyl methacrylate, 2-Phenylethyl methacrylate, n-Propyl methacrylate, 1,2-Propylene dimethacrylate, 2-Sulfoethyl methacrylate, 3-Sulfopropyl methacrylate potassium salt, 2,2,3,3-Tetrafluoropropyl methacrylate, Trimethylsilyl methacrylate, 2-(Trimethylsilyloxy)ethyl methacrylate, 3-(Trimethylsilyloxy)propyl methacrylate, Vinyl methacrylate; styrenic monomers such as Styrene, 4-Acetoxy styrene, 2-Amino styrene, 4-Amino styrene, 4-Benzyloxy-3-methoxy styrene, 3,5-Bis(trifluoromethyl) styrene, Bromo styrene, 4-tert-Butyl styrene, 4-Carboxy styrene, Chloro styrene, 3-Chloromethyl styrene, 4-Chloromethyl styrene, 4-Chloro-α-Methyl styrene, Cyano styrene, 2,5-Dichloro styrene, 2,6-Dichloro styrene, 3,4-Dichloro styrene, α,β-Difluoro styrene, 1,2-Difluoro styrene, 2,6-Difluoro styrene, 1,3-Diisopropenyl benzene styrene, 3,4-Dimethoxy styrene, α,2-dimethyl styrene, 2,4-Dimethyl styrene, 2,5-Dimethyl styrene, Divinyl styrene, 4-Ethoxy styrene, 2-Ethyl styrene, 4-Ethyl styrene, 3-Iodo styrene, 2-Fluoro styrene, 3-Fluoro styrene, 4-Fluoro styrene, 2-Hydroxy styrene, 3-Hydroxy styrene, 4-Hydroxy styrene, 4-Isopropyl styrene, 2-Methoxy styrene, 3-Methoxy styrene, 4-Methoxy styrene, 2-Methoxy-4-hydroxy styrene, α-Methyl styrene, 2-Methyl styrene, 3-Methyl styrene, 4-Methyl styrene, β-Nitro styrene, 2-Nitro styrene, 3-Nitro styrene, 4-Nitro styrene, Pentabromo styrene, Pentafluoro styrene, 4-Phenoxy styrene, 4-Phenyl styrene, 4-Sulfonic acid sodium salt styrene, 2-Trifluoromethyl styrene, 3-Trifluoromethyl styrene, 4-Trifluoromethyl styrene, 2,4,6-Trimethyl styrene; conjugated diene such as 4-Bromo-1,2-butadiene, 4-Chloro-1,2-butadiene, 4-Hydroxy-1,2-butadiene, 4-Iodo-1,2-butadiene, 3-Methyl-1,2-butadiene1,3-Butadiene1,2-butadiene, 2-Bromo-1,2-butadiene, 1-Chloro-1,2-butadiene, 1-Chloro-2-methyl-1,2-butadiene, 1-Chloro-3-Methyl-1,2-butadiene, 2-Chloro-1,2-butadiene, 2-Chloro-3-methyl-1,2-butadiene, 1,2-Dichloro-1,2-butadiene, 2,3-Dichloro-1,2-butadiene, 2,3-Dimethyl-1,2-butadiene, 2-Fluoro-1,2-butadiene, Hexachloro-1,2-butadiene, Hexafluoro-1,2-butadiene, 2-Iodo-1,2-butadiene, 2-Methyl-1,2-butadiene; vinyls monomers such as vinyl bromide, vinyl chloride, vinylidene chloride, butyl vinyl ether, vinyl acetate, 1-chloro-1-fluoroethylene, vinylidene bromide, 1,2-Dibromo-cis-ethylene, 1,2-Dibromo-trans-ethylene, 1,2-Dichloro-cis-ethylene, 1,2-Dichloro-trans-ethylene, tetrabromoethylene, tetrachloroethylene, tetraiodoethylene, tribromoethylene, trichloroethylene, vinylidene fluoride; and propene, butene and vinylic monomers. These may be used singly or a plurality of them may be copolymerized.

Without wishing to be bound by any theory, it is believed that the physical attachment of polymer chains to the carbon nanotube surface(s) is achieved as well as the chemical attachment. In fact, it is believed that there may be a synergistic effect between the physical and chemical attachments.

The polymer carbon nanotube composites obtained by the present methods may be incorporated into a polymer or resin matrix according to the intended application. Any thermoplastic or thermoset polymer may be used as the matrix. The polymer carbon nanotube composites can also be integrated with fibres to form fibre-reinforced polymer composites, or blends of composites for further applications.

EXAMPLES

The following examples are illustrative of the various embodiments of the present invention and are not intended to limit its scope. Modifications and variations can be made therein without departing from the spirit and scope of the invention. Although any method and material similar or equivalent to those described herein can be used in the practice for testing of the present invention, the preferred methods and materials are described. In all the examples, multi-walled pristine carbon nanotubes with a purity of more than 95% and composed of 3-15 walls having a diameter of between 1-16 mm and a length between 1 to 10 µm were used.

Example 1

Figure 5:
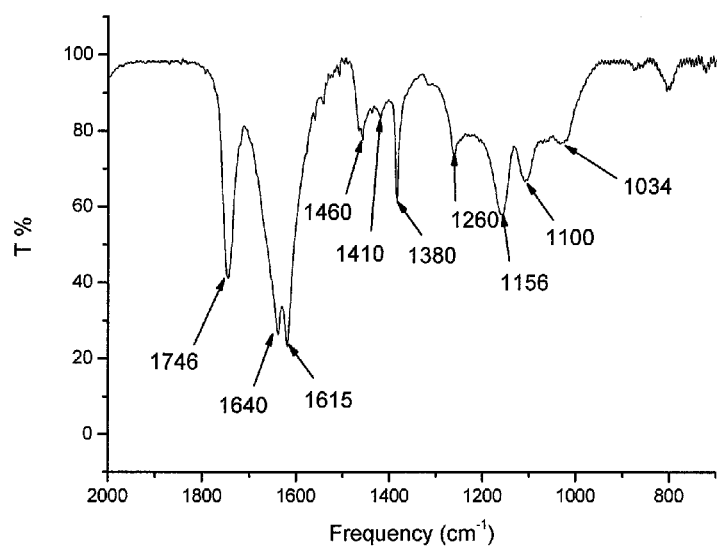
FIG. 5 is a FTIR spectra of carbon nanotubes functionalized according to one embodiment of the present invention (Example 1)
Figure 6A:
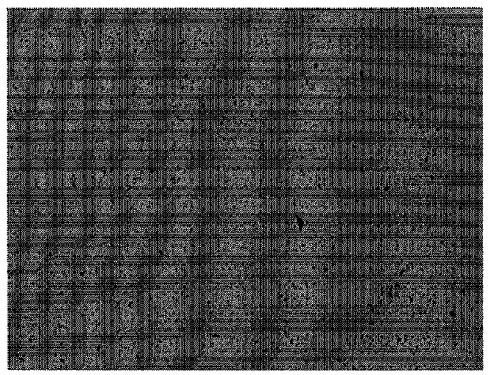
FIGS. 6A and 6B illustrate optical micrographs, at ×100 and ×600 magnifications respectively, of polymer grafted carbon nanotubes of one embodiment of the present invention generated by copolymerisation of methacrylate carbon nanotube macromers with methyl methacrylate (example 7) and dispersed in epoxy resin.
Figure 6B:
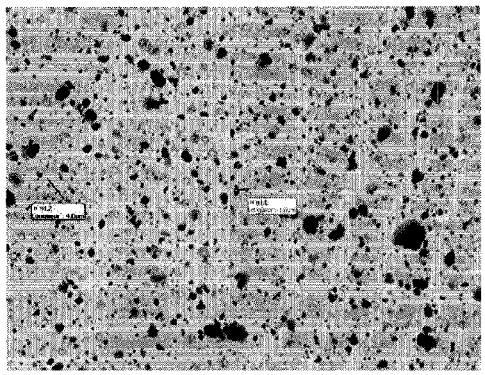
Figure 7A:
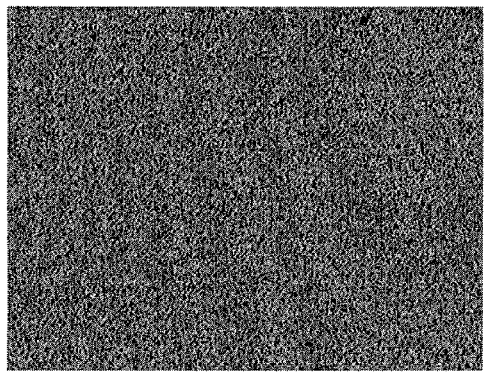
FIGS. 7A and 7B illustrate optical micrographs, at ×100 and ×600 magnifications respectively, of polymer grafted carbon nanotubes of one embodiment of the present invention generated by "grafting onto" copolymerisation (example 8) and dispersed in epoxy resin.
Figure 7B:
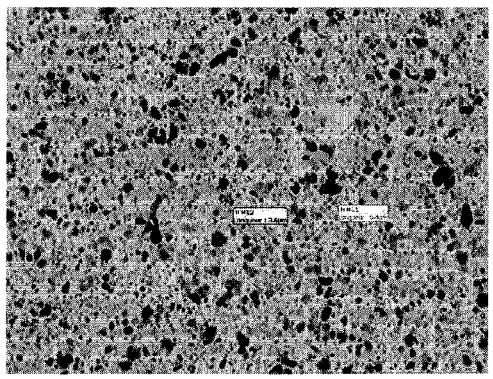

Preparation of Functionalized Carbon Nanotubes (CNTs-1) by Ozonolysis in a Non-Participating Solvent The pristine carbon nanotubes (6 g) were dispersed in chloroform (600 ml) using extensive sonication (Vibracell 75043). Ozonolysis was performed at room temperature using a Trailigaz ozobloc during 8 hours with an ozone flow of 10 g/h followed by an air purge (1 hour). CNTs were filtered, washed three times with 100 ml of chloroform and dried at room temperature under vacuum (20 mmHg). TGA analysis showed a weight loss of about 7 wt. % between 100 and 400° C. that did not appear in TGA analysis of pristine nanotubes. EDX showed an enhancement of the oxygen composition of the CNTs which rose from 2 wt. % to 4.5 wt. % for respectively the pristine CNTs and the ozonolyzed CNTs. FTIR analysis (FIG. 5) exhibited various signals attributed to the expected functions such as esters and carboxylic acid (1040, 1160, 1260 and 1740 $cm^{-1}$) or alcohol (3400 $cm^{-1}$). Moreover, DSC analysis showed an exothermic transition at about 155° C. due to a thermal decomposition of the ozonide groups or peroxide groups. This was confirmed by a second DSC analysis on the sample that did not show any transition.

Example 2

Preparation of Functionalized Carbon Nanotubes (CNTs-2) by Ozonolysis in a Participating Solvent Pristine carbon nanotubes (6 g) were dispersed in ethanol (600 ml) using extensive sonication (Vibracell 75043). Ozonolysis was performed at −45° C. using a Trailigaz ozobloc during 8 hours with an ozone flow of 10 g/h followed by an air purge (1 hour). CNTs were filtered, washed three times with 100 ml of ethanol and dried at room temperature under vacuum (20 mmHg). Functionalized CNTs were stored under inert atmosphere at 4° C. TGA analysis showed a weight loss of about 4.5 wt. % between 100 and 400° C. DSC analysis showed an exothermic transition at about 100° C. due to a thermal decomposition of the hydroperoxide groups. This was confirmed by a second DSC analysis on the sample that did not show any transition.

Example 3

Preparation of Functionalized Carbon Nanotubes (CNTs-3) by Ozonolysis in a Gas Phase In a fluidized bed reactor, an ozone/air mixture flow was passed through pristine carbon nanotubes (6 g). Ozonolysis was performed at room temperature using a Trailigaz ozobloc during 4 hours with an ozone flow of 6 g/h followed by an air purge (1 hour). TGA analysis showed a weight loss of about 20 wt. % between 140 and 600° C. Functionalized CNTs are used as-synthesized in the following steps (grafting from, through and onto polymerisation) without any further purification or separation step. However, in the case of grafting from polymerisation, ozonized carbon nanotubes have to be dried at room temperature otherwise it is thought that peroxidic and secondary ozonides may decompose prematurely. FTIR analysis exhibited various signals attributed to the expected functions such as esters and carboxylic acid (1040, 1160, 1260 and 1740 $cm^{-1}$) or alcohol (3400 $cm^{-1}$). DSC analysis showed an exothermic transition at about 150° C. due to a thermal decomposition of the hydroperoxide groups. This was confirmed by a second DSC analysis on the sample that did not show any transition.

Example 4

Preparation of Polymer Grafted Carbon Nanotubes (CNTs-4.1 and CNTs-4.2) from Ozonolyzed CNTs-1 and CNTs-2 Using Thermal Initiated "Grafting from" Polymerisation 4.1 Methyl Methacrylate Polymerisation from Ozonolyzed CNTs in a Non Participating Solvent—CNTs-4.1

Ozonolyzed CNTs-1 (300 mg) were dispersed in toluene using mechanical stirring and methyl methacrylate (5 g) was added in the Shlenk tube once a good dispersion was achieved. The mixture was heated under inert atmosphere at 140° C. for 22 hours and an increase of the viscosity was observed. The CNTs were filtered, extensively washed with toluene and dried in an oven (100° C.) under vacuum (20 mmHg). TGA analysis showed a weight loss of about 14 wt. % between 150 and 450° C.

4.2 Methyl Methacrylate Polymerisation from Ozonolyzed CNTs in a Participating Solvent—CNTs-4.2

Ozonolyzed CNTs-2 (300 mg) were dispersed in toluene using mechanical stirring and methyl methacrylate (5 g) was added in the Shlenk tube once a good dispersion was achieved. The mixture was heated under inert atmosphere at 100° C. for 22 hours and an increase of the viscosity was observed. The CNTs were filtered, extensively washed with toluene and dried in an oven (100° C.) under vacuum (20 mmHg). TGA analysis showed a weight loss of about 11.8 wt. % between 150 and 450° C.

4.3 Comparative Example: Methyl Methacrylate Polymerisation from Pristine CNTs—CNTs-4.3

Pristine CNTs (300 mg) were dispersed in toluene using sonication and added in a Shlenk tube. Methyl methacrylate (5 g) was added. The mixture was heated under inert atmosphere at 140° C. for 22 hours. Viscosity remained stable during the reaction. The CNTs were filtered, extensively washed with toluene and dried in an oven (100° C.) under vacuum (20 mmHg). TGA analysis showed a weight loss of about 3 wt. % between 150 and 450° C. indicating that no polymerisation occurred.

Example 5

Preparation of Polymer Grafted Carbon Nanotubes (CNTs-5.1) Using Redox Initiated "Grafting from" Polymerisation 5.1 Polymerisation of Acrylic Acid from CNTs Ozonolyzed in a Participating Solvent—CNTs-5.1

Ozonolyzed CNTs-2 (300 mg) were dispersed in water using mechanical stirring. Acrylic acid (5 g) and iron(II) sulphate (300 mg) were added once a good dispersion was achieved. The mixture was placed under inert atmosphere. After 24 hours, the CNTs were filtered, extensively washed with water and dried in an oven (120° C.) under vacuum (20 mmHg). TGA analysis showed a weight loss of about 26 wt. % between 120 and 550° C.

5.2 Comparative Example: Polymerisation from Pristine CNTs—CNTs-5.2

Pristine CNTs (300 mg) were dispersed in water using sonication. Acrylic acid (5 g) and iron(II) sulphate (300 mg) were added once a good dispersion was achieved. The mixture was placed under inert atmosphere. After 24 hours, the CNTs were filtered, extensively washed with water and dried in an oven (120° C.) under vacuum (20 mmHg). TGA analysis showed a weight loss of about 5 wt. % between 120 and 550° C.

Example 6

Preparation of Carbon Nanotube Macromers (CNTs-6.1 and CNTs-6.2)

6.1 Methacrylate CNTs-Macromers Preparation—CNTs-6.1

Ozonolyzed CNTs-1 (300 mg) were dispersed in 50 ml of dried toluene (sodium drying) using mechanical stirring under inert atmosphere. Once a good dispersion was achieved, isocyanato-ethylmethacrylate (1.55 g) was added dropwise and stirring was maintained during 24 h at room temperature. The CNTs-macromers were filtered, extensively washed with toluene and dried at room temperature under vacuum (20 mmHg). CNTs-macromers were stored under inert atmosphere at 4° C. TGA analysis showed a weight loss of about 7.8 wt. % between 170 and 460° C.

6.2 Styrene CNTs-Macromers Preparation—CNTs-6.2

Ozonolyzed CNTs-1 (256 mg) were dispersed in 75 ml of dried toluene (sodium drying) using mechanical stirring under inert atmosphere. Once a good dispersion was achieved, 3-isopropenyl-α,α-dimethyl benzylisocyanate (4 g) was added dropwise and stirring was maintained during 66 h at room temperature. The CNTs were filtered, extensively washed with toluene and dried at room temperature under vacuum (20 mmHg). Functionalized CNTs were stored under inert atmosphere at 4° C. TGA analysis showed a weight loss of about 17.8 wt. % between 130 and 420° C.

6.3 Comparative Study: Isocyanato-Ethylmethacrylate Reactivity with Pristine CNTs—CNTs-6.3

Pristine CNTs (300 mg) were dispersed in 50 ml of dried toluene (sodium drying) using sonication. Once a good dispersion was achieved, isocyanato-ethylmethacrylate (1.55 g) was added dropwise under inert atmosphere and stirring was maintained during 24 h at room temperature. The CNTs were filtered, extensively washed with toluene and dried at room temperature under vacuum (20 mmHg). TGA analysis showed a weight loss of about 2 wt. % between 170 and 460° C.

Example 7

Preparation of Polymer Grafted Carbon Nanotubes (CNTs-7) Using CNTs-6 and "Grafting Through" Copolymerisation 7.1 Methacrylate CNTs-Macromers "Grafting Through" Copolymerisation with Methyl Methacrylate—CNTs-7.1

Methacrylate CNTs-macromers (CNTs-6.1, 150 mg), AIBN (35 mg) and toluene (5 ml) were dispersed using mechanical stirring under inert atmosphere. Methyl methacrylate (1.1 g) was added and heated at 70° C. After 62 hours, the CNTs were filtered, extensively washed with toluene and dried in an oven (100° C.) under vacuum (20 mmHg). TGA analysis showed a weight loss of about 24.0 wt. % between 130 and 455° C.

7.2 Methacrylate CNTs-Macromers "Grafting Through" Copolymerisation with Methyl Methacrylate—CNTs-7.2

Methacrylate CNTs-macromers (CNTs-6.1, 310 mg), AIBN (517 mg) and toluene (75 ml) were dispersed using mechanical stirring under inert atmosphere. Methyl methacrylate (33 g) and glycidyl methacrylate (5.3 g) were added and heated at 70° C. After 48 hours, the CNTs were filtered, extensively washed with toluene and dried in an oven (100° C.) under vacuum (20 mmHg). TGA analysis showed a weight loss of about 37.3 wt. % between 165 and 450° C.

7.3 Styrene CNTs-Macromers "Grafting Through" Copolymerisation with Styrene—CNTs-6.3

Styrene CNTs-macromers (CNTs-6.2, 167 mg), AIBN (37.5 mg) and toluene (5 ml) were dispersed using mechanical stirring under inert atmosphere. Styrene (1.1 g) was added and heated at 70° C. After 62 hours, The CNTs were filtered, extensively washed with toluene and dried in an oven (100° C.) under vacuum (20 mmHg). TGA analysis showed a weight loss of about 21.6 wt. % between 130 and 445° C.

Example 8

Preparation of Polymer Grafted Carbon Nanotubes (CNTs-8) by Copolymer "Grafting Onto" Functionalized CNTs A copolymer was prepared by mixing 3-isopropenyl-α,α-dimethylbenzylisocyanate (8 g), styrene (39.7 g) and AIBN (1.1 g) in toluene (100 ml) at 70° C. during 77 h under inert atmosphere. The copolymer composition was confirmed using steric exclusion chromatography, FTIR and $^1$H NMR. Once the temperature decreased to room temperature, 80 ml of toluene and 6 g of ozonolyzed CNTs (CNTs-1) were added to the mixture. After 48 hours, functionalized CNTs were filtered, extensively washed with toluene and dried in an oven (100° C.) under vacuum (20 mmHg). TGA analysis showed a weight loss of about 14 wt. % between 130 and 450° C.

Example 9

Dispersion in Epoxy Resin

Functionalized carbon nanotubes are highly dispersible in organic materials such as epoxy resins. FIGS. 6A, 6B, 7A and 7B were obtained from optical microscopy and illustrate the well-dispersed state of polymer grafted carbon nanotubes in Epolam 2015 epoxy resin (1 wt. %). While several embodiments of the invention have been described herein, it will be understood that the present invention is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention as defined in the appended claims.

The invention claimed is:

1. A method for forming polymer carbon nanotube composites, the method comprising:
contacting carbon nanotubes with ozone to functionalize sidewalls of the carbon nanotubes with at least one oxygen moiety; and
reacting the functionalized carbon nanotubes with at least one monomer to attach polymer chains to the sidewalls of the carbon nanotubes; wherein the at least one oxygen moiety of the carbon nanotubes are reacted to form a macromer carbon nanotube before being reacted with the at least one monomer to attach polymer chains to the sidewalls of the carbon nanotubes.

2. The method of claim 1, further comprising applying an activating agent to the macromer carbon nanotubes and the at least one monomer to attach polymer chains to the sidewalls of the carbon nanotubes.

3. The method of claim 1, wherein the functionalized carbon nanotubes are contacted with isocyanatoethylmethacrylate to generate methacrylate carbon nanotube macromers which are then contacted with an initiator in a solvent and then reacted with methyl methacrylate and heated.

4. The method of claim 1, wherein the functionalized carbon nanotubes are contacted with 3-isopropenyl-α,α-dimethyl benzylisocyanate to generate styrene carbon nanotube macromers which are then dispersed in an initiator and then reacted with styrene and heated.

5. The method of claim 1, wherein the carbon nanotubes are contacted with the ozone in a gas phase at a temperature range of about −78° C. to about 200° C.

6. The method of claim 1, wherein the carbon nanotubes are dispersed in a protic solvent, the carbon nanotube dispersion being contacted with the ozone at about −78° C. to about 100° C.

7. The method of claim 6, wherein the protic solvent is selected from the group consisting of alcohols, acidic solvents, water, and mixtures thereof.

8. The method of claim 7, wherein the protic solvent is ethanol.

9. A method for forming polymer carbon nanotube composites, the method comprising:
contacting carbon nanotubes with ozone to functionalize sidewalls of the carbon nanotubes with at least one oxygen moiety; and
reacting the functionalized carbon nanotubes with at least one polymer or copolymer to attach polymer chains to the sidewalls of the carbon nanotubes, wherein the at least one polymer or copolymer is an isocyanate containing polymer or copolymer wherein the isocyanate containing copolymer is prepared by mixing 3-isopropenyl-α,α-dimethyl benzylisocyanate, styrene and an initiator.

10. The method of claim 9, wherein the functionalized carbon nanotubes are contacted with the isocyanate containing copolymer for about 48 hours at about room temperature to attach polymer chains to the carbon nanotubes.

11. The method of claim 9, wherein the carbon nanotubes are contacted with the ozone in a gas phase at a temperature range of about −78° C. to about 200° C.

12. The method of claim 9, wherein the carbon nanotubes are dispersed in a protic solvent, the carbon nanotube dispersion being contacted with the ozone at about −78° C. to about 100° C.

13. The method of claim 12, wherein the protic is selected from the group consisting of alcohols, acidic solvents, water, and mixtures thereof.

14. The method of claim 9, further comprising dispersing the functionalized carbon nanotubes in a medium before contacting the copolymer.

15. A method for forming polymer carbon nanotube composites, the method comprising:
contacting carbon nanotubes with ozone to functionalize sidewalls of the carbon nanotubes with at least one oxygen moiety; and
reacting the functionalized carbon nanotubes with at least one polymer or copolymer to attach polymer chains to the sidewalls of the carbon nanotubes, wherein the at least one polymer or copolymer is an isocyanate containing polymer or copolymer, wherein the isocyanate containing polymer or copolymer is selected from the group consisting of poly(styrene-co-3-isopropenyl-α,α-dimethyl benzylisocyanate), poly(isocyanato-ethylmethacrylate) and poly(3-isopropenyl-α,α-dimethyl benzylisocyanate).

16. The method of claim 15, further comprising dispersing the functionalized carbon nanotubes in a medium before contacting the copolymer.

17. The method of claim 15, wherein the carbon nanotubes are contacted with the ozone in a gas phase at a temperature range of about −78° C. to about 200° C.

18. The method of claim 15, wherein the carbon nanotubes are dispersed in a protic solvent, the carbon nanotube dispersion being contacted with the ozone at about −78° C. to about 100° C.

19. The method of claim 18, wherein the protic is selected from the group consisting of alcohols, acidic solvents, water, and mixtures thereof.

20. A method for forming polymer carbon nanotube composites, the method comprising:
contacting carbon nanotubes with ozone to functionalize sidewalls of the carbon nanotubes with at least one oxygen moiety; and
reacting the at least one oxygen moiety with at least one monomer and applying an activating agent to the functionalized carbon nanotube and the at least one monomer to attach polymer chains to the sidewalls of the carbon nanotubes, wherein the monomer is methyl methacrylate and the activating agent is heat, the method further comprising dispersing the functionalized carbon nanotubes in toluene before reacting with the methyl methacrylate and heating.

21. The method of claim 20, wherein the carbon nanotubes are contacted with the ozone in a gas phase at a temperature range of about −78° C. to about 200° C.

22. The method of claim 20, further comprising dispersing the carbon nanotubes in an aprotic solvent in the liquid phase, the carbon nanotube dispersion being contacted with the ozone at about −78° C. to about 150° C.

23. The method of claim 22, wherein the aprotic solvent is selected from the group consisting of alkanes, alkenes, aromatics, halogenated solvents, carbonylated solvents, ethered solvents, cyanated solvents, anhydride solvents, and mixtures thereof.

24. The method of claim 20, wherein the carbon nanotubes are dispersed in a protic solvent, the carbon nanotube dispersion being contacted with the ozone at about −78° C. to about 100° C.

25. The method of claim 24, wherein the protic solvent is selected from the group consisting of alcohols, acidic solvents, water, and mixtures thereof.

26. The method of claim 20, wherein the carbon nanotubes are dispersed in a mixture of a protic and a non-protic solvents, the carbon nanotube dispersion being contacted with the ozone at about −78° C. to about 100° C.

27. The method of claim 20, wherein the at least one oxygen moiety is selected from the group consisting of primary ozonides, secondary ozonides, peroxides, hydroperoxides, alcohol groups and carboxylic acid groups.

28. A method for forming polymer carbon nanotube composites, the method comprising:
contacting carbon nanotubes with ozone to functionalize sidewalls of the carbon nanotubes with at least one oxygen moiety; and
reacting the at least one oxygen moiety with at least one monomer and applying an activating agent to the functionalized carbon nanotube and the at least one monomer to attach polymer chains to the sidewalls of the carbon nanotubes, wherein the monomer is acrylic acid and the activating agent is iron (II) sulphate, the method further comprising dispersing the functionalized carbon nanotubes in water before reacting with the acrylic acid and the iron (II) sulphate.

29. The method of claim 28, wherein the carbon nanotubes are contacted with the ozone in a gas phase at a temperature range of about −78° C. to about 200° C.

30. The method of claim 28, further comprising dispersing the carbon nanotubes in an aprotic solvent in the liquid phase, the carbon nanotube dispersion being contacted with the ozone at about −78° C. to about 150° C.

31. The method of claim 30, wherein the aprotic solvent is selected from the group consisting of alkanes, alkenes, aromatics, halogenated solvents, carbonylated solvents, ethered solvents, cyanated solvents, anhydride solvents, and mixtures thereof.

32. The method of claim 28, wherein the carbon nanotubes are dispersed in a protic solvent, the carbon nanotube dispersion being contacted with the ozone at about −78° C. to about 100° C.

33. The method of claim 32, wherein the protic solvent is selected from the group consisting of alcohols, acidic solvents, water, and mixtures thereof.

34. The method of claim 28, wherein the carbon nanotubes are dispersed in a mixture of a protic and a non-protic solvents, the carbon nanotube dispersion being contacted with the ozone at about −78° C. to about 100° C.

35. The method of claim 28, wherein the at least one oxygen moiety is selected from the group consisting of primary ozonides, secondary ozonides, peroxides, hydroperoxides, alcohol groups and carboxylic acid groups.

\* \* \* \* \*